United States Patent [19]

Gantenbine

[11] Patent Number: 4,766,867
[45] Date of Patent: Aug. 30, 1988

[54] FUEL SUPPLY SYSTEM FOR INTERNAL COMBUSTION ENGINE

[76] Inventor: Harvey A. Gantenbine, 680 Oakwood Ct., Los Altos, Calif. 94022

[21] Appl. No.: 80,614

[22] Filed: Aug. 3, 1987

[51] Int. Cl.$^4$ .............................................. F02B 3/00
[52] U.S. Cl. ..................................... 123/438; 123/546
[58] Field of Search ............................... 123/546, 438

[56] References Cited

U.S. PATENT DOCUMENTS

| | | | |
|---|---|---|---|
| 1,889,270 | 11/1932 | Thomas | 123/546 |
| 2,353,787 | 7/1944 | Rostoker | 123/546 |
| 2,518,305 | 8/1950 | Goldberg | 123/546 |
| 2,791,995 | 5/1957 | Dietrich | 123/438 |
| 3,614,945 | 10/1971 | Schlagmuller et al. . | |
| 3,935,853 | 2/1976 | Rivere . | |
| 4,057,042 | 11/1977 | Aono | 123/438 |
| 4,167,165 | 9/1979 | Finlay et al. . | |
| 4,187,805 | 2/1980 | Abbey . | |
| 4,188,928 | 2/1980 | Faustinos | 123/546 |
| 4,242,992 | 1/1981 | Kawamura et al. . | |
| 4,364,354 | 12/1982 | Kosuge | 123/438 |
| 4,434,762 | 3/1984 | McCabe | 123/438 |
| 4,457,271 | 7/1984 | Fitch . | |
| 4,572,134 | 2/1986 | Nouthuka | 123/438 |

*Primary Examiner*—Ronald B. Cox
*Attorney, Agent, or Firm*—Flehr, Hohbach, Test, Albritton & Herbert

[57] ABSTRACT

A fuel supply system of a type for use with an internal combustion engine employs a valve assembly and a circuit for controlling the valve assembly to supply fuel to the engine at a greater or lesser rate respectively in response either to initial closure of an ignition switch when the engine is cold, according to one mode of operation, and in response to acceleration of the engine, according to another mode of operation. The fuel supply system serves to include means for preheating or vaporizing the fuel supplied to the engine.

3 Claims, 1 Drawing Sheet

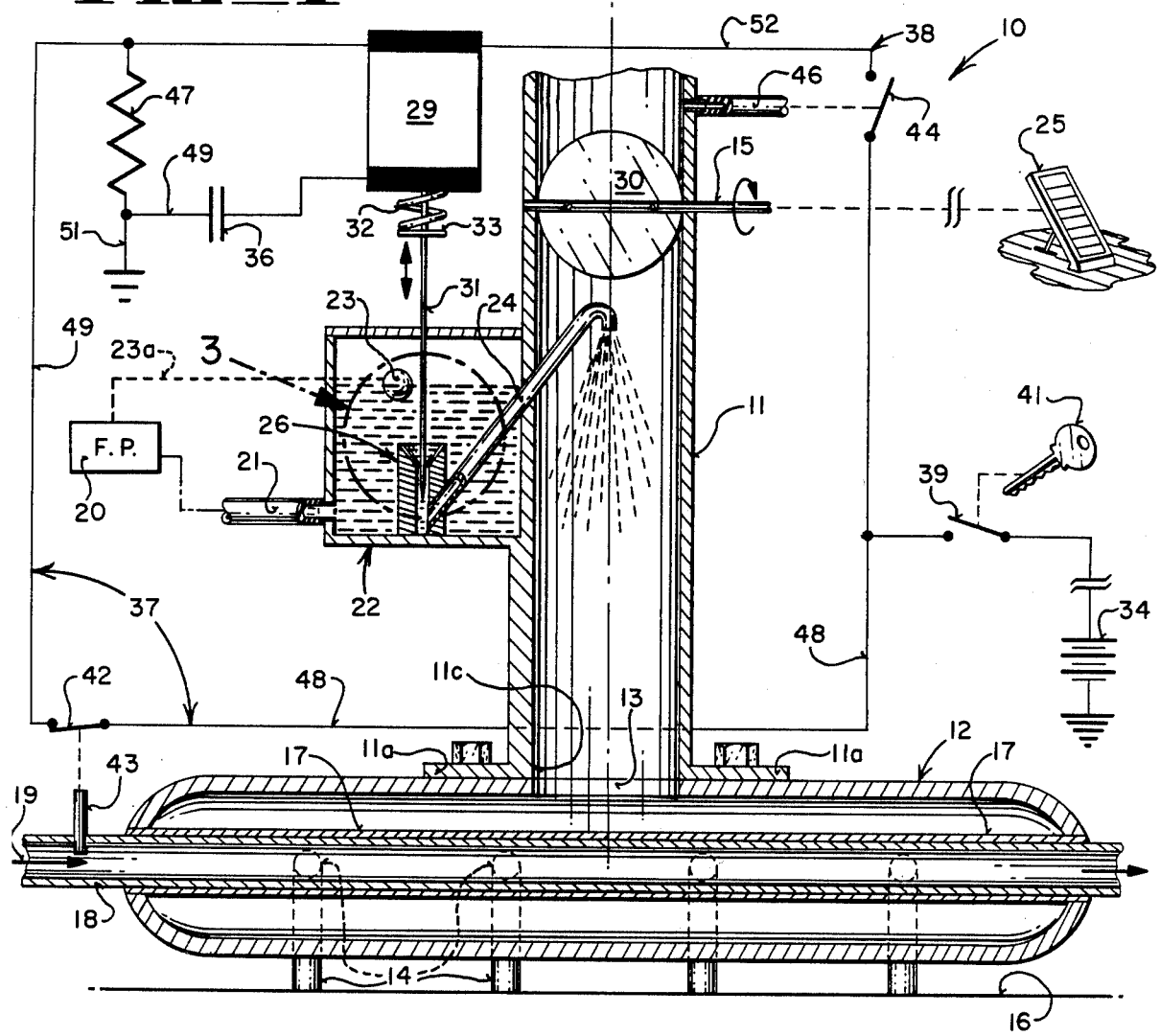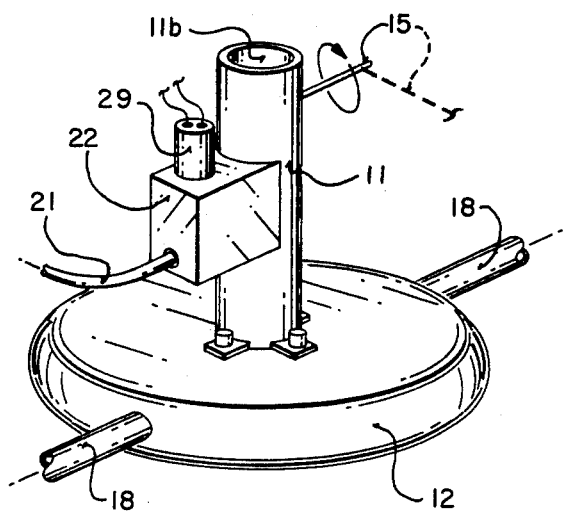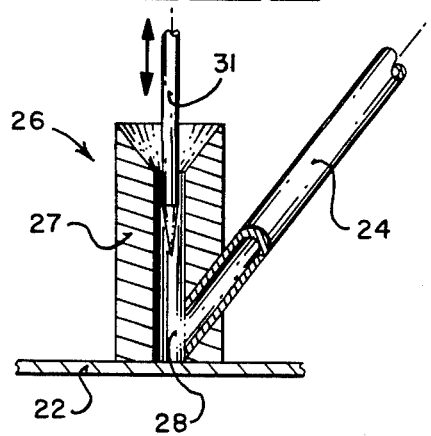

FUEL SUPPLY SYSTEM FOR INTERNAL COMBUSTION ENGINE

This invention pertains to a fuel supply system for use with an internal combustion engine and more particularly to a fuel supply system characterized by means for maintaining a supplemental supply of fuel and means for automatically discharging the fuel into the air intake passage for the engine in response to either acceleration of the engine or initial ignition of the engine.

In the past, various designs have been provided for "choking" a carburetor so as to enrich the vaporized mixture of fuel and air passing to the engine. This has been done by cutting down the flow path for air so as to reduce the proportion of air to fuel by volume, thereby enriching the vaporized mixture of fuel and air. Thus, the so-called automatic choke was developed to control the flow rate of air via the carburetor under certain conditions.

However, the automatic choke has tended to require frequent adjustment since it has been difficult to adjust the intake of air to a point whereby it provides the correct air flow. As disclosed herein a fuel system for enriching a vaporized mixture of fuel and air automatically on demand functions in an "ON/OFF" mode in a manner adding a supplemental charge of fuel into the air intake thereby minimizing adjustments.

The foregoing ON/OFF mode operates in response to one or the other of two sensors respectively indicating a cold engine or a demand for acceleration of the engine operation.

Further, the discharge of a supplemental charge of fuel to the air intake cools the mixture of fuel and air which may cause inefficient combustion upon arrival within a cylinder of the engine. This is particularly undesirable when substantial acceleration is desired. Therefore, on its way to the combustion cylinders the mixture of fuel and air passes across a body heated by exhaust gasses so as to provide enhanced vaporization of the fuel/air mixture.

SUMMARY OF THE INVENTION

In general a container serves to hold a supplemental charge of fuel to be selectively delivered into the air intake of an internal combustion engine at either a first or a second flow rate. The fuel system includes means forming a fuel flow passage exposed at one end to the suction in the air intake for delivering fuel thereto. In addition, means movable between advanced and retracted positions to respectively restrict and enlarge the fuel flow path serves to provide a first or second rate of fuel delivery into the air intake. The movable means is activated to move to enlarge the fuel flow passage in response to the initial closure of the ignition switch or in response to a sudden increase in air flow along the air intake passage. In addition, the air intake entrains the charge of fuel to provide a vaporized mixture of fuel and air to be carried therealong. Means heated by engine exhaust gasses and disposed in the path of said mixture of fuel and air serves to preheat the mixture so as to enhance combustion thereof.

OBJECTS OF THE INVENTION

In general it is an object of the present invention to provide an improved fuel supply system.

It is another object of the invention to provide a fuel supply system characterized by means serving to automatically enrich the vaporized mixture of fuel and air in response to the initial closure of the ignition switch when the engine is cold or in response to a sudden increase in air flow via the air intake of the engine.

It is another object of the invention to provide means for preheating the fuel/air mixture passing via the air intake to combustion chambers of the engine.

It is yet an additional object of the invention to provide the foregoing means for preheating the mixture of air and fuel by directing exhaust gasses across the path thereof.

The foregoing and other objects of the invention will become more readily evident from the following detailed description of a preferred embodiment when considered in conjunction with the drawings.

DESCRIPTION OF THE DRAWINGS

FIG. 1 shows a diagrammatic side elevation system view in section according to the invention;

FIG. 2 shows a diagrammatic perspective view of the assembly shown in FIG. 1;

FIG. 3 shows a diagrammatic elevation section view of a detail pertaining to the valve means according to the invention.

DESCRIPTION OF A PREFERRED EMBODIMENT

A fuel system 10 includes a vaporizing chamber 12 formed to include an inlet opening 13 and a plurality of outlet ports 14 each of which has been coupled to supply a vaporized fuel/air mixture to an engine 16 represented diagrammatically by the single line.

In addition, vaporizing chamber 12 carries an elongate heating jacket 17 to extend through the interior of chamber 12 and to support a tube 18 in heat transfer relation therebetween. Thus, tube 18 can be part of an exhaust pipe or system whereby hot exhaust gasses, represented diagrammatically by arrow 19, can pass via tube 18 and thereby heat the surrounding jacket 17. Vaporizing chamber 12 supports an open ended air intake housing 11 by means of the radially extending tabs 11a bolted to the top of chamber 12.

Housing 11 includes an upper opening 11b which is open to receive air therethrough and a bottom opening 11c serving to discharge air into chamber 12 to form an air flow path between openings 11b, (FIG. 2) 11c. As is known, an arrangement of the kind described to this point serves to apply a suction to the interior of air intake housing 11. The flow rate of air through housing 11 can be controlled by the positioning of a butterfly valve 30 mounted on a control rod 15 and operably coupled to an accelerator pedal 25.

Means for supplying fuel to be entrained in and vaporized by the flow of air via air intake 11 includes a fuel pump 20, diagrammatically shown in FIG. 1. Fuel pump 20 supplies fuel via a tubing 21 or other suitable flow passage which leads into a fuel storage container 22. A float valve serves to control the level of fluid within container 22 by deactivating fuel pump 20 whenever the fuel level in container 22 has risen to a predetermined level.

Thus, a float valve is represented diagrammatically by the float 23 and dashed line 23a extending therefrom to fuel pump 20 and indicating a connection between float 23 and fuel pump 20 for achieving such control.

An elongate spout 24 extends between container 22 and the flow passage within intake 11 and functions as an aspirator for drawing fuel from container 22. Thus, a valve assembly 26 includes a hollow valve body 27 formed with an open bore 28. Spout 24 extends in fluid communication between bore 28 and the flow passage within air intake 11, whereby the air flow within intake 11 causes spout 24 to function as an aspirator for drawing fuel from container 22 and causing it to be entrained with the incoming air flow within intake 11. In this way a fuel/air mixture is applied directly into chamber 12.

Means for selectively delivering fuel into intake 11 at a first or second flow rate includes means movable between advanced and retracted positions to respectively restrict and enlarge the fuel flow path into spout 24 thereby providing either of two rates of fuel flow into intake 11, as now to be described.

Thus, a solenoid 29 carries an elongate rod 31 spring-loaded downwardly therefrom as shown. While this function frequently may be carried out within the solenoid itself, for clarity, a spring 32 and retaining washer 33 are shown as disposed about rod 31. The lower end of rod 31 moves into and out of bore 28 (FIG. 3) so as to restrict and enlarge the fuel flow path via bore 28 and spout 24. When rod 31 is advanced, it forms an annular flow path with the inner side wall of bore 28. However, when retracted, the flow path via bore 28 is enlarged and made circular, thereby increasing the cross section of the flow path from that of the annular flow path described above.

Thus, fuel flow under normal conditions is dependent upon the clearance surrounding the inserted end of rod 31 and accordingly this can be readily adjusted to provide an optimum appropriate flow.

Means for enriching the fuel/air mixture in response to a sudden increase in air flow along intake 11, as when accelerating, as well as in response to the initial closure of the ignition switch, as when starting a cold engine, includes the control system as now to be described.

Thus, the means for operating valve assembly 26 includes an electric power supply such as the battery 34, solenoid 29 coupled to ground via the capacitor 36. Each of a first and second circuit branch 37, 38 serves to interconnect battery 34 to solenoid 29 under one or the other of two operating conditions, respectively. Each of the two circuit branches are electrically coupled to power supply 34 via an ignition switch 39 typically operated by a key 41.

Branch 37 includes a normally closed switch 42 coupled to a thermocouple 43 or other heat-responsive element capable of opening switch 42 upon sensing a predetermined degree of heat. Accordingly, thermocouple 43 has been mounted in the side wall of exhaust tube 18 whereby upon sensing of sufficient heat passing therethrough thermocouple 43 will serve to open circuit branch 37.

Similarly, in circuit branch 38 a normally open low-pressure-sensitive switch 44 responds to sensing of low pressure via flow passage 46 whenever the rate of air flow via air intake 11 is suddenly increased as by means of fully opening the butterfly valve 30.

As noted above butterfly valve 30 is carried on an operating rod 15 coupled to an accelerator pedal 25. Finally, resistor 47 defines the voltage across solenoid 29 as well as providing a timing circuit in conjunction with capacitor 36.

Thus, each of the two circuit branches 37, 38 includes an associated switch for purposes described further below. The switches 42, 44 serve to connect and disconnect solenoid 29 from battery 34 via an associated one of the two branches 37, 38. Thus, upon closure of ignition switch 39 solenoid 29 will be activated by virtue of the fact that current will flow to solenoid 29 via a path traced from battery 34, ignition switch 39, lead 48, normally closed switch 42, lead 49, solenoid 29, and capacitor 36.

During the time which it takes to charge capacitor 36 solenoid 29 will remain in its energized state so as to retract rod 31 from bore 28 of valve assembly 26. After capacitor 36 has been charged, rod 31 will be urged by spring 32 into bore 28 to restrict fuel flow therethrough, and the charge carried by capacitor 36 will drain to ground via leads 49, 51.

Energizing of solenoid 29 serves to discharge a quantity of fuel from container 22 directly into air intake 11 thereby enriching the fuel/air mixture supplied to engine 16. After engine 16 has started, the exhaust gasses 19 will ultimately provide sufficient heat to thermocouple 43 so as to cause it to open switch 42, thereby deenergizing solenoid 29 and causing rod 31 to be urged by spring 32 downwardly into bore 28 of valve assembly 26. In this latter position, a reduced flow of fuel will be provided to the engine as appropriate.

The supplemental amount of fuel discharged from container 22 will be the volume defined between the top of valve body 27 and the level of the free surface of fuel within container 22. When bore 28 is restricted the level of the free surface of fuel obviously increases whereby upon retraction of rod 31 serves to discharge a substantial volume of fuel into intake 11.

In operation of the engine when it is desired to cause it to accelerate, the accelerator pedal 25 is normally urged substantially downwardly so as to open butterfly valve 30 to its maximum open condition, thereby significantly increasing the flow rate of air passing via air intake 11. This sudden increase in the flow of air is readily sensed by low-pressure-sensitive element 46 so as to close switch 44. Upon closing of switch 44 solenoid 29 will again be energized by an electrical path traced from battery 34, ignition switch 39, lead 48, switch 44, lead 52 and then to ground via solenoid 29 as described above. After the period of acceleration is concluded, switch 44 again opens and solenoid 29 becomes deenergized so as to dispose the end of rod 31 into bore 28 of valve assembly 26.

Thus, vacuum-sensitive means coupled to operate switch 44 is disposed to sense the vacuum in the flow path of air via intake 11 and to respond to a sudden change in the vacuum sensed in that flow path so as to close switch 44 and thereby energize solenoid 29.

From the foregoing it will be readily evident that the discharge of raw fuel into the air intake to be mixed with the incoming flow of air and discharged via the bottom opening 13 becomes preheated by virtue of the temperature of jacket 17 so that the fuel/air mixture leading to intake ports 14 will provide improved combustion.

In addition, it has been observed that a system as described above will provide more efficient combustion so as to increase the vehicle mileage per gallon consumed and result in a cleaner exhaust.

I claim:

1. In a fuel supply system for use with an internal combustion engine of a type controlled by an accelerator pedal, said system comprising means forming a fuel vaporizing chamber, an air intake housing having openings therein, one of said openings being open to receive air therethrough, another of said openings serving to discharge air into said chamber to form a flow path defined between said openings, said flow path leading into said chamber, variable valve means within said air intake housing for controlling the flow rate of air therealong, means for injecting fuel into air moving along said flow path to provide a mixture of fuel and air, the means for injecting fuel into the flow path comprises a supplemental fuel storage chamber, a fuel supply line adapted and designed to be coupled to said fuel storage chamber and to a fuel pump for partially filling and refilling said fuel storage chamber, means forming a spout extending between said fuel storage chamber and said flow path for delivering fuel into the flow path at a location which is subjected to suction from the flow of air passing to the vaporizer chamber, said flow of air across the open discharge end of said spout serving to aspirate fuel from said storage chamber via said spout and into said flow path, means for suddenly releasing a supplemental charge of fuel to travel from said storage chamber into said flow path, the last named said means including a valve movable between advanced and retracted positions respectively reducing and enlarging the fuel flow path via said spout, means for operating said valve to retract said valve in response to accelerated flow of air via the first named flow path caused by accelerated movement of said foot pedal thereby enriching the fuel mixture delivered to said vaporizing chamber, said means for operating said valve including an electric power supply, a solenoid and first and second circuit branches, each said branch serving to interconnect said power supply and said solenoid, ignition switch means for electrically coupling both said branches to said power supply, first and second switches disposed respectively in said first and second branches, said switches serving to connect and disconnect said solenoid to said power supply via an associated one of said branches, said first switch being normally closed and said second switch being normally open whereby closure of said ignition switch serves to engage said solenoid via said first branch, heat responsive means coupled to operate said first switch, said heat responsive means being disposed to sense the heat at said tube and in response to sensing a predetermined degree of heat serving to open said first switch to deenergize said solenoid, and vacuum sensitive means coupled to operate said second switch, said vacuum sensitive means being disposed to sense the vacuum in said flow path and to respond to a sudden increase in vacuum sensed in said flow path to close said second switch to energize said solenoid via said second branch, means extending across the interior of said chamber to provide a heat exchange jacket, means for carrying hot exhaust gases from the engine through said jacket for heating same, said jacket being disposed in the path of the fuel/air mixture entering the chamber for preheating the mixture to precondition the fuel/air mixture for ignition when delivered to a cylinder of the engine.

2. In a system according to claim 1 in which said means for operating said fuel valve between advanced and retracted positions responds to initial activation of an ignition circuit when the engine is not sufficiently warm.

3. A fuel supply system for use with an internal combustion engine, said system comprising means defining a flow path for drawing a fuel/air mixture into the internal combustion engine, means for aspirating liquid fuel into the flow path of air taken into the engine so as to supply fuel mixed with air, means forming a chamber for vaporizing and preheating the mixture of fuel and air, an elongate tubular body extending across the interior of said vaporizing chamber and disposed in said flow path of said fuel/air mixture, said body serving to carry an exhaust tube extending therealong in heat transfer relation therebetween, said exhaust tube being adapted to pass hot exhaust gasses along said tube for heating said body in response to passage of the hot gasses, said tube when so heated serving to preheat the fuel/air mixture passing thereacross before delivery thereof to a combustion chamber of the engine, and means for automatically enriching the air/fuel mixture being supplied to the engine and operable in response to accelerating the engine or in response to initial ignition of the engine, the last named said means comprising a supplemental fuel storage chamber, a fuel supply line adapted and designed to be coupled to said chamber and to a fuel pump for partially filling and refilling said chamber, means forming a spout extending between said fuel storage chamber and said flow path for delivering fuel into the flow path at a location which is subjected to suction from the flow of air passing to the vaporizer chamber, said flow of air across the open discharge end of said spout serving to aspirate fuel from said storage chamber via said spout and into said flow path, means for suddenly releasing a supplemental charge of fuel to travel from said storage chamber into said flow path, the last named said means including a valve movable between advanced and retracted positions respectively reducing and enlarging the fuel flow path via said spout, means for operating said valve to retract said valve in response to accelerated flow of air via the first named flow path caused by accelerated movement of said foot pedal thereby enriching the fuel mixture delivered to said vaporizing chamber, said means for operating said valve including an electric power supply, a solenoid and first and second circuit branches, each said branch serving to interconnect said power supply and said solenoid, ignition switch means for electrically coupling both said branches to said power supply, first and second switches disposed respectively in said first and second branches, said switches serving to connect and disconnect said solenoid from said power supply via an associated one of said branches, said first switch being normally closed and said second switch being normally open whereby closure of said ignition switch serves to engage said solenoid via said first branch, heat responsive means coupled to operate said first switch, said heat responsive means being disposed to sense the heat at said tube and in response to sensing a predetermined degree of heat serving to open said first switch to deenergize said solenoid, and vacuum sensitive means coupled to operate said second switch, said vacuum sensitive means being disposed to sense the vacuum in said flow path and to respond to a sudden increase in vacuum sensed in said flow path to close said second switch to energize said solenoid via said second branch.

* * * * *